(12) United States Patent
Balakrishnan et al.

(10) Patent No.: US 12,049,218 B2
(45) Date of Patent: Jul. 30, 2024

(54) EVALUATING THE SAFETY PERFORMANCE OF VEHICLES

(71) Applicant: Cambridge Mobile Telematics Inc., Cambridge, MA (US)

(72) Inventors: Hari Balakrishnan, Belmont, MA (US); Samuel Madden, Newton, MA (US); Jun-geun Park, Cambridge, MA (US); William Bradley, Arlington, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 16/521,856

(22) Filed: Jul. 25, 2019

(65) Prior Publication Data

US 2021/0024058 A1 Jan. 28, 2021

(51) Int. Cl.
*B60W 30/09* (2012.01)
*B60W 30/095* (2012.01)
*G05D 1/00* (2024.01)

(52) U.S. Cl.
CPC .......... *B60W 30/09* (2013.01); *B60W 30/095* (2013.01); *G05D 1/0214* (2013.01)

(58) Field of Classification Search
CPC combination set(s) only.
See application file for complete search history.

(56) References Cited

U.S. PATENT DOCUMENTS

| | | | |
|---|---|---|---|
| 9,535,878 B1 | 1/2017 | Brinkmann et al. | |
| 9,940,676 B1 * | 4/2018 | Biemer | G07C 5/008 |
| 10,909,629 B1 * | 2/2021 | Madigan | G07C 5/008 |
| 2013/0317665 A1 | 11/2013 | Fernandes et al. | |
| 2014/0058761 A1 | 2/2014 | Freiberger et al. | |
| 2017/0101093 A1 * | 4/2017 | Barfield, Jr. | B60W 30/095 |
| 2018/0075309 A1 | 3/2018 | Sathyanarayana et al. | |
| 2018/0075538 A1 | 3/2018 | Konrardy et al. | |

(Continued)

FOREIGN PATENT DOCUMENTS

| | | |
|---|---|---|
| JP | 2017151546 | 8/2017 |
| JP | 2018180727 | 11/2018 |
| WO | WO 2018155159 | 8/2018 |

OTHER PUBLICATIONS

PCT International Search Report and Written Opinion in International Appln. No. PCT/US2020/42320, dated Oct. 19, 2020, 10 pages.

(Continued)

*Primary Examiner* — Ian Jen
*Assistant Examiner* — Renee LaRose
(74) *Attorney, Agent, or Firm* — Fish & Richardson P.C.

(57) ABSTRACT

Among other things, safety performance of vehicles is monitored or evaluated, or both. Sensor data is received from one or more sensors at a vehicle. One or more risk sources encountered by the vehicle during a period of operation of the vehicle are identified based on the sensor data. One or more safety events experienced by the vehicle during the period of operation are identified based on the sensor data. A risk of a safety event experienced by the vehicle during the period of operation is determined based on the one or more risk sources. A safety performance of the vehicle during the period of the vehicle during the period of operation of the vehicle is determined based on the one or more safety events and the risk.

18 Claims, 3 Drawing Sheets

(56) References Cited

U.S. PATENT DOCUMENTS

2018/0201263 A1* 7/2018 Slusar .................. B60W 30/09
2018/0342033 A1   11/2018 Kislovskiy et al.
2018/0342034 A1* 11/2018 Kislovskiy ....... G06Q 10/06315
2019/0263401 A1*  8/2019 Yoo ...................... B60W 30/16

OTHER PUBLICATIONS

AU Office Action in Australian Appln. No. 2020318895, dated Dec. 2, 2022, 4 pages.
EP Extended Search Report in European Appln. No. 20843727.7, dated Jul. 15, 2022, 8 pages.
Office Action in Canadian Appln. No. 3,147,603, dated Feb. 24, 2023, 6 pages.
Office Action in Japanese Appln. No. 2022-504630, mailed on May 30, 2025, 11 pages (with English translation).

* cited by examiner

EVALUATING THE SAFETY
PERFORMANCE OF VEHICLES

BACKGROUND

This description relates to evaluating the safety performance of vehicles.

Autonomous vehicles hold the promise of being safer than conventional vehicles driven by humans. To assess the relative safety performance of autonomous vehicles and conventional vehicles, industry professionals and regulatory bodies use safety-correlated metrics such as crash rate, which measures the number of vehicle crashes in which a vehicle has been involved relative to the number of miles traveled by the vehicle.

Because conventional vehicles have recorded many more miles than autonomous vehicles, and thus have been exposed to significantly higher risks of vehicle crashes, autonomous vehicle producers are racing to accumulate miles to obtain statistically meaningful, exposure-based measurements of vehicle safety performance for comparison with conventional vehicles.

SUMMARY

In general, in an aspect, safety performance of vehicles is monitored or evaluated, or both. Sensor data is received from one or more sensors at a vehicle. One or more risk sources encountered by the vehicle during a period of operation of the vehicle are identified based on the sensor data. One or more safety events experienced by the vehicle during the period of operation are identified based on the sensor data. A risk of a safety event experienced by the vehicle during the period of operation is determined based on the one or more risk sources. A safety performance of the vehicle during the period of operation is determined based on the one or more safety events and the risk.

The risk can be measured by a risk score. The period of operation of the vehicle can be associated with a distance traveled by the vehicle. The period of operation of the vehicle can be associated with a time of operation of the vehicle. The sensors can be included in one or more telematics devices at the vehicle.

The one or more risk sources can include environmental risk sources due to conditions or features of the environment in which the vehicle is operated. The environmental risk sources can include other vehicles in the environment. The one or more safety events can include a crash of the vehicle or near-crash of the vehicle, or both. Determining the risk can include determining a risk of a safety event posed by each of the risk sources.

Risk sources due to the conduct of a driver of the vehicle can be filtered from the one or more risk sources. A sum of the risk of the safety event posed by each of the risk sources can be calculated to determine the risk. The sum of the risk can be a weighted sum. Determining the safety performance of the vehicle can include determining a sum of the one or more safety events relative to the risk. The sum of the one or more safety events relative to the risk can be a weighted sum. Each of the one or more safety events can be weighted based on the severity of the safety event The risk can be applied to a distance traveled by the vehicle during the period of operation of the vehicle to produce a risk-normalized distance traveled by the vehicle. The safety performance of the vehicle during the period of operation of the vehicle can be determined based on the one or more safety events and the risk-normalized distance traveled. The risk can be normalized based on a standard level of risk experienced for the period of operation of the vehicle. A safety performance of a second vehicle in a same environment as the vehicle during at least part of the period of operation of the vehicle can be determined based on the sensor data. The safety performance of the second vehicle can be determined based on identifying one or more risk sources experienced by the second vehicle in the same environment as the vehicle during at least part of the period of operation of the vehicle. One or more safety events experienced by the second vehicle during at least part of the period of operation of the second vehicle can be identified based on the sensor data.

A risk of a safety event experienced by the second vehicle during at least part of the period of operation of the vehicle can be determined based on the one or more risks experienced by the second vehicle. A relative safety performance of the vehicle during at least part of the period of operation of the vehicle can be determined by comparing the safety performance of the vehicle with the safety performance of the second vehicle. The risk for the vehicle can be combined with a risk of a safety event for one or more other vehicles having a same vehicle type as the vehicle. A safety performance of the vehicle type can be determined based in part on the combined risk.

In general, in an aspect, a system including one or more processors is provided. The system includes computer storage storing executable computer instructions executable by the one or more processors to receive sensor data from one or more sensors at a vehicle. The instructions are executable by the one or more processors to identify, based on the sensor data, one or more risk sources encountered by the vehicle during a period of operation of the vehicle. The instructions are executable by the one or more processors to identify, based on the sensor data, one or more safety events experienced by the vehicle during the period of operation of the vehicle. The instructions are executable by the one or more processors to determine, based on the one or more risk sources, a risk of a safety event experienced by the vehicle during the period of operation of the vehicle. The instructions are executable by the one or more processors to determine, based on the one or more safety events and the risk, a safety performance of the vehicle during the period of operation of the vehicle.

Determining the safety performance of the vehicle can include determining a sum of the one or more safety events relative to the risk. The computer storage can store instructions executable by the one or more processors to apply the risk to a distance traveled by the vehicle during the period of operation of the vehicle to produce a risk-normalized distance traveled by the vehicle, and determine, based on the one or more safety events and the risk-normalized distance traveled, the safety performance of the vehicle during the period of operation of the vehicle.

The computer storage can store instructions executable by the one or more processors to identify, based on the sensor data, one or more risks experienced by a second vehicle in a same environment as the vehicle during at least part of the period of operation of the vehicle. The computer storage can store instructions executable by the one or more processors to identify, based on the sensor data, one or more safety events experienced by the second vehicle during at least part of the period of operation of the vehicle. The computer storage can store instructions executable by the one or more processors to determine, based on the one or more risks experienced by the second vehicle, a risk of a safety event experienced by the second vehicle during at least part of the period of operation of the vehicle. The computer storage can store instructions executable by the one or more processors to determine, based on the one or more safety events experienced by the second vehicle and the risk for the second vehicle, a safety performance of the second vehicle during at least part of the period of operation of the vehicle.

In general, in an aspect, a computer-readable storage medium having instructions executable by one or more processors is provided. The instructions are executable by the one or more processors to cause the processors to perform one or more operations. The one or more operations include receiving sensor data from one or more sensors at a vehicle. The one or more operations include identifying, based on the sensor data, one or more risk sources encountered by the vehicle during a period of operation of the vehicle. The one or more operations include identifying, based on the sensor data, one or more safety events experienced by the vehicle during the period of operation of the vehicle. The one or more operations include determining, based on the one or more risk sources, a risk of a safety event experienced by the vehicle during the period of operation of the vehicle. The one or more operations include determining, based on the one or more safety events and the risk, a safety performance of the vehicle during the period of operation of the vehicle.

The one or more operations can include applying the risk to a distance traveled by the vehicle during the period of operation of the vehicle to produce a risk-normalized distance traveled by the vehicle. The one or more operations can include determining, based on the one or more safety events and the risk-normalized distance traveled, the safety performance of the vehicle during the period of operation of the vehicle. The one or more operations can include identifying, based on the sensor data, one or more risks experienced by a second vehicle in a same environment as the vehicle during at least part of the period of operation of the vehicle. The one or more operations can include identifying, based on the sensor data, one or more safety events experienced by the second vehicle during at least part of the period of operation of the vehicle. The one or more operations can include determining, based on the one or more risks experienced by the second vehicle, a risk of a safety event experienced by the second vehicle during at least part of the period of operation of the vehicle. The one or more operations can include determining, based on the one or more safety events experienced by the second vehicle and the risk for the second vehicle, a safety performance of the second vehicle during at least part of the period of operation of the vehicle.

In general, in an aspect, a system including one or more processors and a plurality of modules is provided. The system includes a risk identification module executable by the one or more processors to identify, based on sensor data from one or more sensors at a vehicle, one or more risk sources encountered by the vehicle during a period of operation of the vehicle. The system includes a safety event identification module executable by the one or more processors to identify, based on the sensor data, one or more safety events experienced by the vehicle during the period of operation of the vehicle. The system includes a risk scoring module executable by the one or more processors to determine, based on the one or more risk sources, a risk of a safety event experienced by the vehicle during the period of operation of the vehicle. The system includes a safety performance evaluation module executable by the one or more processors to determine, based on the one or more safety events and the risk, a safety performance of the vehicle during the period of operation of the vehicle.

In general, in an aspect, a system is provided that includes a device in a vehicle configured to capture operating period information indicating the extent or duration of one or more periods of operation of the vehicle. The device is configured to capture safety information indicative of risks and safety events involving the vehicle or a vehicle in the vicinity of the vehicle during each of the one or more periods of operation of the vehicle. The device is configured to send the operating period information and the safety information to a server for processing to determine a safety performance of the vehicle based on a risk score and the safety events.

These and other aspects, features, and implementations can be expressed as methods, apparatus, systems, components, program products, methods of doing business, means or steps for performing a function, and in other ways, and will become apparent from the following descriptions, including the claims.

DESCRIPTION

Figure 1:
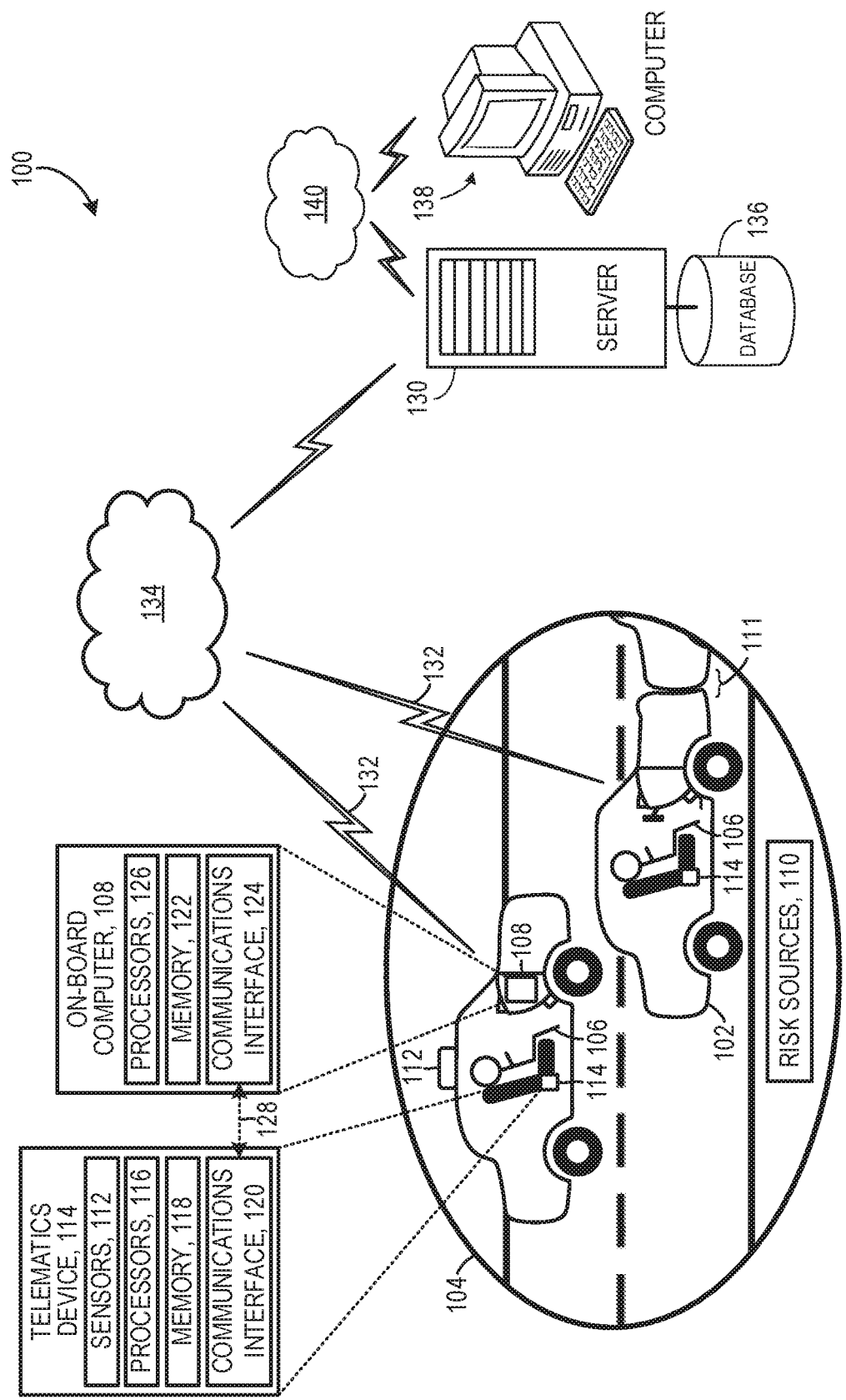
FIG. 1 is a schematic diagram illustrating a vehicle safety performance evaluation technology 100.

Each time a vehicle operates, it may be exposed to certain situations or conditions that put the safety of the vehicle, its users, or the surrounding public at risk. For example, a vehicle may encounter risk due to features or conditions of the environment in which it operates, such as the weather or the proximity of other vehicles, risk due to conduct by the driver of the vehicle (for example, speeding, distracted driving, and so forth), risk due to the vehicle itself (for example, damage to or malfunctioning of the vehicle, and so forth. We sometimes refer to the situations or conditions that produce risk as "risk sources," and we use the term "risk" broadly to refer to the likelihood of injury, loss, or another undesirable outcome due to one or more risk sources.

Fortunately, the majority of risk that a vehicle encounters may be avoided or otherwise managed by the vehicle or its driver. In some cases, however, risk can materialize in the form of a vehicle crash, a near-crash, or another unsafe condition at the vehicle, which we sometimes refer to collectively as a "safety event."

To measure the safety of a vehicle or its driver, or both (sometimes referred to as the "safety performance" of the vehicle or its driver), it may be useful to understand how the vehicle or its driver responds when exposed to the risk of a safety event. For example, vehicle crash rate seeks to measure the safety performance of a vehicle by calculating the number of reported vehicle crashes relative to the vehicle-miles traveled (VMT). In this way, vehicle crashes can serve as a measure of the materialization of risk at the vehicle, and VMT can serve as a proxy for the risk experienced by the vehicle.

However, vehicle crash rate can be an imprecise measure of safety performance. Many vehicle crashes may go unreported, and measuring safety based solely on vehicle crashes can fail to consider other safety events, such as near-crashes, that can be important for measuring the safety performance of the vehicle or the driver, or both. Further, the risk of a safety event experienced by the vehicle typically varies from mile to mile. For example, operating a vehicle on a rural road at midnight under normal weather conditions may pose substantially less risk per mile than operating the same vehicle on a congested urban road during rush hour when it is snowing. As a result, using VMT as a proxy for the risk experienced by a vehicle, without more, may produce inaccurate or biased measurements of the vehicle's safety performance.

The vehicle safety performance evaluation technology described in this specification (sometimes referred to as "the technology") can acquire and process sensor data generated at a vehicle to evaluate the safety performance of the vehicle or other vehicles in the surrounding environment. To do so, the technology can receive sensor data from one or more sensors installed in the vehicle, included in a telematics device (for example, a smartphone) brought into the vehicle, or both. The technology can process the acquired sensor data to identify the sources of risk encountered by the vehicle and the safety events experienced by the vehicle during operation. In some cases, the technology is capable of using the identified risk sources, safety events for the vehicle, and safety events of other vehicles to establish the risk of a safety event posed by each risk source. Based on the identified risk sources and the established risk, the technology can generate a risk score that corresponds to the risk of a safety event experienced by the vehicle during a particular period of operation, such as a distance traveled or time operated. Because the generated risk score can account for both the actual sources of risk encountered by the vehicle and the risk of a safety event posed by each source, the technology, when compared with conventional systems, can generate a risk score that serves as a more accurate measure of the risk experienced by the vehicle during the period of operation.

The technology can use the risk score to evaluate the safety performance of a vehicle. In some cases, the technology can determine the safety performance of a vehicle by calculating the number of safety events experienced by the vehicle over a particular period of operation relative to the risk score for the vehicle over the same period. For example, the technology may determine from the sensor data that, over a distance of one mile, the vehicle encountered ten risk sources and experienced one safety event in the form of a near-crash. Based on the ten identified risk sources and the risk of a safety event posed by each source, the technology can determine the risk of a safety event for the vehicle over the mile, which can be represented as a risk score. Assuming, for example, that the risk score for the vehicle over the mile is determined to be 0.05 (indicating a 5% chance of a safety event), the technology can divide the number of safety events (1) by the risk score (0.05) to determine that the safety performance of the vehicle over the mile is equal to 20. In this way, safety events can serve as a measure of the materialization of risk at the vehicle, and the risk score can serve as a measure of the risk of a safety event experienced by the vehicle. By more accurately defining the vehicle's exposure to risk through the risk score, the technology can better approximate the safety performance of the vehicle compared to techniques that rely solely on VMT as a proxy for risk.

In some cases, the technology can evaluate the safety performance of the vehicle or vehicle type over multiple periods of operation. We use the term "vehicle type" broadly to include any set of two or more vehicles that share a common characteristic, such as a vehicle make, a vehicle model, an autonomous vehicle, a conventional vehicle, or a vehicle class, such as a sedan, a SUV, a truck, among others. To do so, the technology can combine multiple risk scores for a vehicle or vehicle type to determine a combined risk score that represents the total risk of a safety event encountered by the vehicle or vehicle type over multiple periods of operation. The technology can then calculate the combined number of safety events experienced by the vehicle or vehicle type relative to the combined risk score to determine the safety performance of the vehicle or vehicle type. By combining the safety events and risk scores, statistically significant metrics of safety performance can be determined and compared among different vehicles or vehicle types. For example, when applied to all travel by conventional vehicles, the technology can evaluate the safety performance of all conventional vehicles and their human drivers. When applied to all travel by autonomous vehicles, the technology can evaluate the safety performance of all autonomous vehicles and their autonomous (for example, computer-implemented) drivers. In this way, the technology can assess the relative safety performance of conventional vehicles, autonomous vehicles, and their human or computer-implemented drivers.

In some cases, it may be useful to compare the safety performance metrics described here with conventional metrics, such as those that use VMT as a proxy for risk. Accordingly, the technology can normalize the risk score to a standard or average risk of a safety event for a particular period of operation, such as a mile driven under a fixed level or risk. The technology can apply the normalized risk score to produce, for example, a normalized distance traveled by the vehicle or vehicle type based on the actual risk encountered by the vehicle or vehicle type. In this way, low-risk travel, such as driving one mile in the desert at 2 a.m., may result in a reduced risk-normalized distance traveled (for example, 0.1 standard miles), whereas high-risk mile travel, such as driving one mile in Manhattan, N.Y. during rush hour, may result in an increased risk-normalized distance traveled (for example, 3.5 standard miles). The technology can then calculate the number of safety events experienced by the vehicle or vehicle type relative to the risk-normalized distance traveled to determine the safety performance of the vehicle or vehicle type. This is analogous to the conventional metric in which vehicle crashes are taken as the numerator and VMT is taken as the denominator.

To normalize the distance traveled, the distances traveled in an environment can be compared to a "typical" risk-normalized distance. In some implementations, a typical risk-normalized distance traveled refers to a "yearly average" mile. In such instances, risks are aggregated across several driving environments (which can have different attributes, similar attributes, or both) to determine a typical risk for a given location during a given time frame. For example, assume that one "yearly average" mile reflects the aggregated risk corresponding to 100 randomly (or pseudo-randomly) selected one standard mile segments across the United States in the year 2019. A one standard mile segment in the desert at 2 a.m. can be compared to one "yearly average" mile and can be reduced to a risk-normalized distance of 0.1 standard miles, reflecting that the risk of driving one standard mile in the desert at 2 a.m. can be less risky than driving one average standard mile.

In some implementations, a typical risk-normalized distance traveled refers to a "Cambridge" mile. In such instances, a canonical road segment and point in time is arbitrarily determined and the determined segment and point in time is defined as a "Cambridge" mile. For example, assume that one "Cambridge" mile reflects the risk of driving a selected one standard mile segment of Massachusetts Avenue in the Porter Square section of Cambridge, MA on Apr. 13, 2019 from 1:00 p.m. to 2:00 p.m. A one standard mile segment of Manhattan, N.Y. between 5:00 p.m. and 6:00 p.m. can be compared with one "Cambridge" mile, and can be increased to a risk-normalized distance of 3.5 standard miles, reflecting that the risk of driving one standard mile in Manhattan between 5:00 p.m. and 6:00 p.m. can be more risky that driving one "Cambridge" mile.

In some implementations, the technology can use sensor data produced at a vehicle to evaluate the safety performance of other vehicles in the surrounding environment. For example, the technology can process the sensor data produced at the vehicle to identify risk sources, safety events, and a risk score for the vehicle and each of the other vehicles in the surrounding environment. The technology can then use the safety events and the risk scores to evaluate the safety performance of the vehicle and each of the other vehicles in the surrounding environment. By evaluating the safety performance of both the vehicle and the other vehicles in the surrounding environment, the technology can increase the amount of data collected and can make comparisons between the safety performance of the vehicle and the other surrounding vehicles. Such a comparison may be significant because the risk sources experienced by the vehicle and surrounding vehicles during operation (such as the weather, the road conditions, the amount of traffic, and so forth) can be similar.

FIG. 1 is a schematic diagram illustrating a vehicle safety performance evaluation technology 100. Generally, the technology 100 can include a variety of components and devices that cooperate to perform the activities and functions described in this specification. Each of the components and devices can include one or more hardware components, software applications, and data communication channels for communicating data between the hardware components and software applications of devices that are part of the technology. Some of the components and devices can be implemented as computer-readable storage mediums containing computer-readable instructions for execution by one or more processors within the technology 100. The technology 100 shown in FIG. 1 can include additional, fewer, or alternate components, including those discussed previously and later.

Referring to FIG. 1, the technology 100 is capable of monitoring and evaluating the safety performance of one or more vehicles 102 as they operate within an environment 104. Each of the vehicles 102 are capable of being operated by a driver 106 (e.g., a conventional vehicle), by an on-board computer 108 (e.g., an autonomous vehicle), or by a combination of a driver 106 and an on-board computer 108 (e.g., a semi-autonomous vehicle). However, the techniques described here are not limited to these vehicles, and we use the term "vehicle" broadly to include, for example, any kind of ground conveyance such as a car, truck, bus, bicycle, motorcycle, or recreational vehicle, among others. The environment 104 may include the surroundings, such as the road, infrastructure, pedestrians, or other vehicles, and conditions, such as the time of day, the weather, or the level of lighting, in which the vehicle 102 operates.

As each vehicle 102 operates within the environment 104, it may encounter one or more risk sources 110 that expose the vehicle, its users, or the surrounding public to risk.

For example, in some cases, the vehicle 102 may encounter one or more risk sources 110 due to the environment 104 (sometimes referred to as "environmental risk sources"). The one or more risk sources 110 due to the environment can include one or more features or conditions of the environment such as, among others, the weather, the time of day, the level of lighting, the angle of lighting, the road type, the road condition, the area of the road in which the vehicle is operating (for example, an intersection, a merge lane, a shoulder, and so forth), the level of vehicle traffic, the level of pedestrian traffic, the speed of vehicles in the environment, the geography, the presence (or absence) of road markings, the presence (or absence) of construction, the proximity of the vehicle to other vehicles or objects, the speed of other vehicles, or the acceleration of other vehicles, the behavior of other vehicles.

In some cases, the vehicle 102 may be exposed to one or more risk sources 110 due to the driver 106 of the vehicle (sometimes referred to as "driver-specific risk sources"). For example, the one or more risk sources 110 due to the driver 106 can include one or more of the following: distracted driving (for example, driving while talking on the phone), driving while incapacitated, speeding, hard acceleration, hard braking, hard cornering, drifting, or swerving.

In some cases, the vehicle 102 may be damaged or malfunctioning, and thus may be a source of risk to itself or other vehicles in the environment 104 (sometimes referred to as "vehicle-specific risk sources").

At times, the risk posed by one or more of the risk sources 110 encountered by the vehicle 102 may materialize in the form of a safety event 111 (such as a vehicle crash, a near-crash, or another unsafe condition at the vehicle) that can jeopardize the safety of the users of the vehicle, other persons within the environment 104, or both.

To monitor for the risk sources 110 and safety events 111 experienced by the vehicle 102 or other vehicles within the environment 104, the vehicle 102 can include one or more sensors 112. In some implementations, the one or more sensors 112 include one or more of the following: one or more accelerometers, one or more speed sensors, or one or more position sensors (such as a Global Positioning System (GPS)). In such instances, the one or more sensors 112 can monitor one or more of the following: acceleration, speed, or position of the vehicle 102. In some implementations, the one or more sensors 112 include one or more of the following: one or more audio sensors (such as a microphone), or one or more image sensors (such as an in-cabin camera). In such instances, the one or more sensors 112 can monitor, for example, the driver 106 of the vehicle. In some implementations, the one or more sensors 112 include one or more of the following: one or more radar systems, one or more LIDAR systems, or one or more sonar systems. In such instances, the one or more sensors 112 can monitor, for example, the vehicle 102 or other features in the surrounding environment 104.

In general, the vehicle 102 can include any number or type of sensors 112 suitable to monitor the vehicle 102, its driver 106, and the surrounding environment 104, including, among others, one or more of the following: accelerometers, magnetometers, gyroscopes, inertial measurement units (IMUs), speed sensors, position sensors (such as a GPS), barometric sensors, weight sensors, engine sensors, alternator sensors, odometer sensors, vibration sensors, voltage sensors, oxygen sensors, biometric sensors, light sensors, image sensors, audio sensors, ultrasonic sensors, electronic control unit (ECU) devices, radar systems, LIDAR systems, or sonar systems.

The sensors 112 may be installed in (or on) the vehicle 102, included in one or more telematics devices 114 brought into the vehicle, or both. Each of the one or more telematics devices 114 may include one or more processors 116 and memory 118 to process and store the sensor data and other information, and a communications interface 120 to enable wired or wireless communications with other components or devices of the technology, such as the sensors 112, the on-board computer 108, and a server 130. The telematics devices 114 can include an original equipment manufacturer (OEM) telematics device installed during manufacture of the vehicle 102, or an aftermarket telematics device connected, for example, through an On-Board Diagnostics (OBD) port of, or wireless communications connection to, the vehicle 102. Each of the one or more telematics devices 114 can be battery-powered, solar-powered, connected to the electrical system of the vehicle 102, or combinations of them. In some cases, the telematics devices 114 are capable of being mounted in or on the vehicle 102.

In some cases, the telematics devices 114 are capable of being untethered from the vehicle 102 such that they are moveable within or outside of the vehicle. In some cases, the telematics devices 114 include a tag device placed or affixed in the vehicle 102, such as tags of the kind described in U.S. patent application Ser. No. 14/529,812, entitled "System and Method for Obtaining Vehicle Telematics Data," filed Oct. 31, 2014 and U.S. patent application Ser. No. 16/407,502, entitled "Safety for Vehicle Users," filed May 9, 2019, the entire contents of which are incorporated by reference. In some cases, the telematics devices 114 include a mobile device, such as a smartphone, a wearable device, a tablet computer, a laptop computer, or another portable computing device, and may not necessarily be a telematics device dedicated to a particular vehicle 102. In some cases, the telematics devices 114 include a combination of one or more tag devices and one or more mobile devices. In some cases, the on-board computer 108 is capable of performing some or all of the functions of the telematics device 114.

In some implementations, the on-board computer 108 is capable of receiving and processing the sensor data to operate the vehicle 102 or to assist the driver 106 with operating the vehicle. In some implementations, the on-board computer 108 is capable of receiving the sensor data from the sensors 112, the telematics devices 114, or both, and can store the sensor data in a memory 122. For example, in some cases, the on-board computer 108 interfaces with some or all of the sensors 112 using a wired or wireless communications interface 124 to receive the sensor data. In some cases, the telematics devices 114 are capable of interfacing with some or all of the sensors 112 using a wired or wireless communications interface 120 to receive the sensor data, and the on-board computer 108 and the telematics devices 114 can establish a communications channel 128 between one another to exchange the sensor data and other information. The communications channel 128 can be a wired or wireless communications channel, such as, among others, Bluetooth™, Wi-Fi™, cellular, Radio Frequency Identification (RFID), Near-Field Communication (NFC), or combinations of them. In some cases, the on-board computer 108 or the telematics devices 114, or both, is capable of receiving sensor data or other information from one or more components or devices in the surrounding environment 104, such as infrastructure or an on-board computer 108 or a telematics device 114 in another vehicle 102.

In some implementations, once received, one or more processors 126 of the on-board computer 108 are capable of processing the sensor data in accordance with software instructions or applications stored in the memory 122 to control, for example, the steering, throttle, or braking of the vehicle 102. To facilitate such control, the on-board computer 108 can be communicatively coupled with the controls or components of the vehicle 102 by various electrical or electromechanical components. In some cases, such as those involving fully autonomous vehicles, the vehicle 102 is operable only by the on-board computer 108. In some cases, the on-board computer 108 supplement the controls or components operated by the driver 106 of the vehicle 102, such as the steering wheel, the throttle pedal, or the brake pedal.

In various implementations, the technology 100 is capable of processing the sensor data to evaluate the safety performance of the vehicle 102 or other vehicles within the environment 104. In some cases, the on-board computer 108, the telematics devices 114, or both, are capable of processing the sensor data to carry out the safety performance evaluation in accordance with the techniques described in this specification. In some cases, the on-board computer 108, the telematics device 114, or both, are capable of transmitting the sensor data to the server 130 for processing. For example, the on-board computer 108, the telematics devices 114, or both, can establish a communications channel 132 with a network 134 to exchange the sensor data and other information with the server 130. The network 134 can be the Internet, a cellular network, a Wi-Fi network, a local area network, a wide area network, a satellite network, or any other suitable data transmission network, or combinations of them. Once received, the server 130 is capable of storing the sensor data and other information in a database 136. The database 136 can be implemented using one or more non-transitory computer-readable storage mediums including, but not limited to, hard disk drives, solid-state drives, optical storage drives, or combinations of them.

In some implementations, the on-board computer 108, the telematics devices 114, or both, transmit the sensor data to the server 130 according to a conditional data upload protocol. For example, the on-board computer 108, telematics devices 114, or both, may transmit only a portion of the sensor data to the server 130, while maintaining other portions of the data in, for example, memory 118, 122. The transmitted portion of the sensor data can be data that is considered most likely to be useful in evaluating the safety performance of the vehicle 114. Later, if the server 130 determines that the stored portion of data may be of interest, the on-board computer 108, telematics device 114, or both, can transmit at least a portion of the stored sensor data to the server 130. The telematics devices 114 and the on-board computer 108 can follow a similar conditional data upload protocol when transmitting data between each other. Transmitting data according to the conditional data upload protocol can alleviate concerns related to bandwidth constraints and computational power constraints.

In some implementations, the sensor data is processed in accordance with a tiered data processing protocol. For example, the sensor data can be processed by the telematics devices 114 according to a first tier data processing algorithm while the server 130 processes the data according to a second tier data processing algorithm. In such instances, the first tier data processing algorithm includes a simple, less computationally intensive algorithm (which can be less accurate) when compared to the second tier data processing algorithm. In some implementations, the tiered data processing protocol can include three tiers of data processing algorithms, where one telematics device 114 processes the data using a first tier algorithm, a second telematics device 114 processes data using a second tier algorithm, and the server 130 processes data using a third tier algorithm. Each tier can include a more computationally intensive and accurate algorithm when compared to a previous tier. Processing data in accordance with a tiered data processing protocol can alleviate concerns related to computational power constraints, bandwidth constraints, and computational speed constraints.

Figure 2:
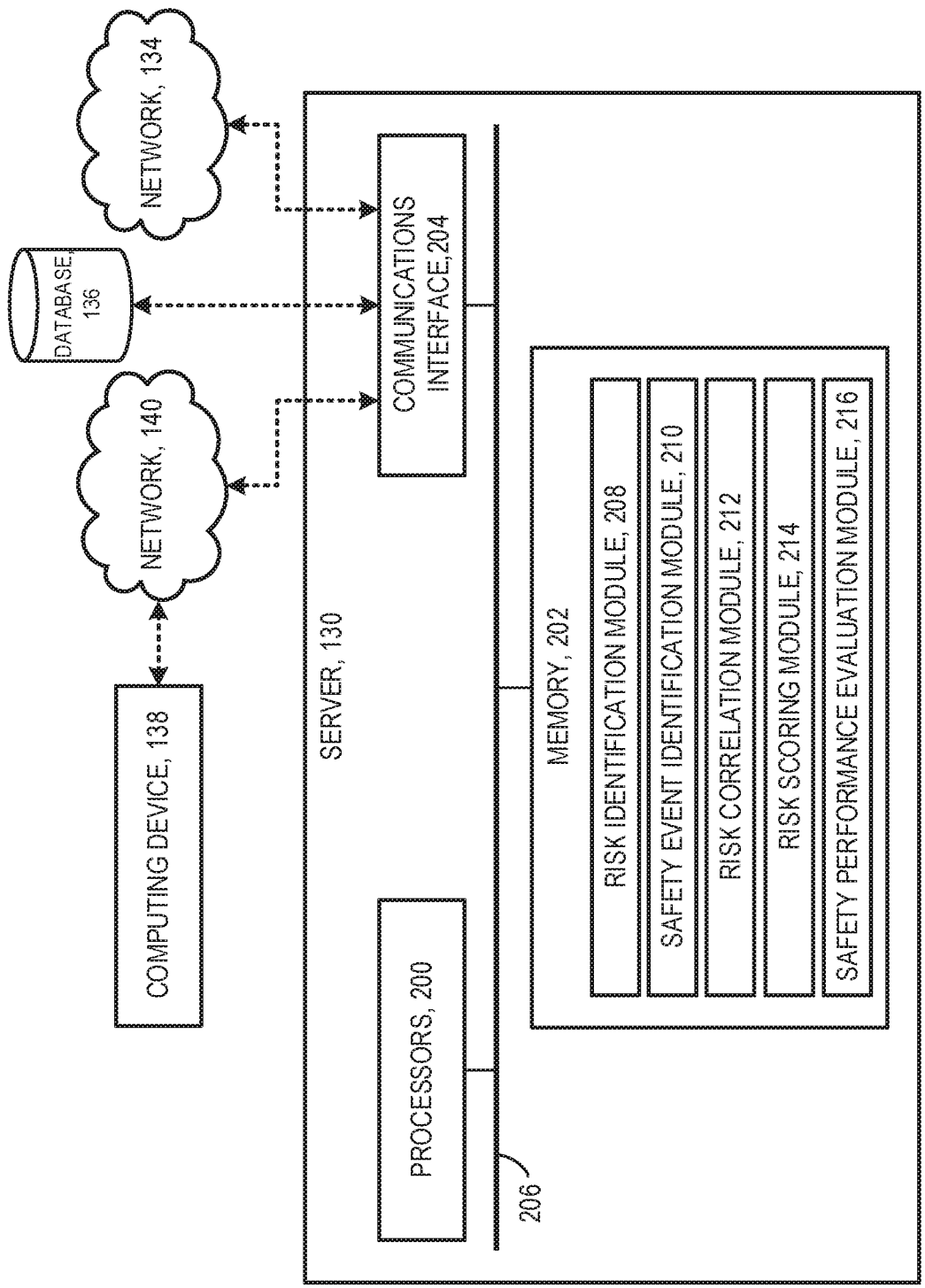
FIG. 2 is a block diagram depicting an example server 130 for evaluating vehicle safety performance.

FIG. 2 is a block diagram depicting an example server 130 for evaluating vehicle safety performance. The shown server 130 includes hardware and software components, such as one or more processors 200, a memory 202, and a communication interface 204, which are interconnected by a data bus 206. The memory 202 can be any non-transitory computer-readable storage medium and can store computer-readable instructions executable by the processors 200. In particular, the memory 202 can store executable instructions associated with a risk identification module 208, a safety event identification module 210, a risk correlation module 212, a risk scoring module 214, a safety performance evaluation module 216, and other modules, to enable the server 130 or other components and devices to carry out the techniques described in this specification. We use the term "module" broadly to include, for example, any code, program, firmware, software object, or other software device or arrangement that can be executed by one or more processors to perform one or more activities, functions, or facilities.

The risk identification module 208 is capable of processing the sensor data produced at the vehicle 102 to identify the risk sources 110 encountered by the vehicle or other vehicles in the surrounding environment 104. In general, the risk identification module 208 can be configured to identify environmental risk sources, driver-specific risk sources, and vehicle-specific risk sources, although additional, fewer, or alternative risk sources may be identified in some implementations. For example, the risk identification module 208 can identify one or more risk sources 110 due to features or conditions of the environment 104, such as the weather, the time of day, the level of lighting, the angle of lighting, the road type, the road condition, the area of the road in which the vehicle is operating (for example, an intersection, a merge lane, a shoulder, and so forth), the level of vehicle traffic, the level of pedestrian traffic, the speed of vehicles in the environment, the geography, the presence (or absence) of road markings, the presence (or absence) of construction, the proximity of the vehicle to other vehicles or objects, or the speed, acceleration, or behavior of other vehicles, or combinations of them, among others. In some cases, the risk identification module 208 is capable of identifying one or more risk sources 110 due to an action (or inaction) by the driver 106 of the vehicle, such as distracted driving, driving while incapacitated, speeding, hard acceleration, hard braking, hard cornering, drifting, or swerving, or combinations of them, among others. In some cases, the risk identification module 208 is capable of identifying one or more risk sources due to damage to or malfunctioning of the vehicle 102.

To identify one or more risk sources 110 at a vehicle 102, the risk identification module 208 is capable of processing the sensor data produced at the vehicle to detect, for example, the presence of a risk source at the vehicle or the exposure level of a risk source at the vehicle, or both, among others. One or more risk sources 110 may either be present or absent at the vehicle 102, and the risk identification module 208 can process the sensor data to determine whether the risk source, and thus the risk, is present (or absent). For example, the risk identification module 208 can process image data from an image sensor at the vehicle 102, such as a road-facing camera, to detect the presence (or absence) of road construction at the vehicle 102. In some cases, one or more risk sources 110 may pose risk that exists along a continuum, and the risk identification module 208 is capable of processing the sensor data to determine the exposure level of the risk source at the vehicle 102. For example, the level of lighting at the vehicle 102 may exist along a continuum, with a lower level of lighting generally corresponding to a higher risk of a safety event due to the reduced visibility. Accordingly, the risk identification module 208 can process the sensor data to identify the exposure level of the risk source 110 (e.g., the level of lighting). In some cases, one or more risk sources 110 may include both presence and exposure level components. For example, the weather at the vehicle 102 can have a presence component, such as the presence of precipitation, and an exposure level component, such as the rate of precipitation. Accordingly, the risk identification module 208 can process the sensor data to identify both the presence of the risk and the exposure level of the risk source.

In some cases, the risk identification module 208 is capable of processing other information in combination with the sensor data to identify one or more risk sources 110. In such instances, the risk identification module 208 is capable of receiving information, such as threshold information, from one or more components or devices of the technology 100 for use in determining whether the sensor data produced at the vehicle 102 indicates a source of risk. For example, to determine whether the speed of the vehicle 102 presents a source of risk, it may be useful to compare the speed data produced by one or more sensors 112 at the vehicle 102 with the speed limit for the road on which the vehicle is traveling. Accordingly, the risk identification module 208 can receive the applicable speed limit data (e.g., based on position data received from sensors at the vehicle) from, for example, the database 136 or through a request to an application programming interface (API) or other service provided on a computing device 138, among others. Once received, the risk identification module 208 can compare the speed limit data with the speed data produced at the vehicle to determine whether the speed of the vehicle 102 is a source of risk. In some cases, the risk identification module 208 is capable of receiving information from one or more components or devices of the technology 100 to determine the presence or exposure level of a risk source 110 at the vehicle 102. For example, the risk identification module 208 can use position data produced by one or more sensors at the vehicle 102 to request weather information from, for example, a weather service provided on a computing device 138 to identify the presence or level, or both, of a weather risk.

In some implementations, the risk identification module 208 is capable of processing sensor data received from the vehicle 102 to identify the risk sources 110 encountered by one or more other vehicles in the environment 104. For example, the risk identification module 208 may associate one or more risk sources 110 identified for the vehicle 102 with other vehicles in the surrounding environment 104. For instance, if it is determined that there is a certain level of risk due to low lighting at the vehicle 102, then the risk identification module 208 may impute the same risk to other vehicles in the same environment 104 as the vehicle 102. In some cases, the risk identification module 208 is capable of using the sensor data produced at the vehicle 102 to determine one or more risk sources 110 experienced by other vehicles in the environment 104. For example, the risk identification module 208 can process sensor data produced at the vehicle 102, such as radar, LIDAR, sonar, or image data, among others, to determine the distance, position, speed, or acceleration, or combinations of them, among others, of another vehicle in the environment 104. The risk identification module 208 may then use this data to identify one or more risk sources 110 for the vehicle 102 or the other vehicle in the environment 104, or both. These identified risk sources, and the risks they pose, can be incorporated into the risk score for the vehicle 102 or used to determine a risk score for the other vehicle, or both, as discussed below. In this way, the technology 100 can identify risk sources, determine a risk score, and evaluate the safety performance of another vehicle in the environment even if the vehicle does not include sensors 112 or is not a participant in the technology. Further, by collecting data for both the vehicle 102 and other vehicles in the surrounding environment 104 over the same time period, the technology 100 can compare the risk score or safety performance, or both, for the vehicle and other vehicles. In doing so, the technology 100 can evaluate the relative safety performance of the vehicle 102 and other vehicles in the environment 104 to make statistically meaningful observations about overall safety performance of both the vehicle 102 and the other vehicles in the environment 104.

The safety event identification module 210 is capable of processing sensor data produced at a vehicle 102 to determine whether the vehicle or other vehicles in the surrounding environment 104 have experienced a safety event, such as a vehicle crash, a near-crash, or another unsafe condition. For example, the safety event identification module 210 may process sensor data produced at the vehicle 102, such as image data, audio data, speed data, or acceleration data, or combinations of them, among others, to identify one or more impacts that are characteristic of a crash by the vehicle or other vehicles. In some cases, the safety event identification module 210 is capable of processing sensor data to identify a near-crash of the vehicle 102 or other vehicles, such as a situation that would have resulted in a crash but for an evasive maneuver by a vehicle or the driver 106 of the vehicle, or another unsafe condition at the vehicle or other vehicles, such as a vehicle driving off the road. In some cases, the safety event identification module 210 is capable of processing sensor data produced at the vehicle 102, such as radar, LIDAR, sonar, or image data, among others, to identify a safety event experienced by other vehicles in the environment 104. In some cases, the safety event identification module 210 is capable of receiving information regarding safety events from one or more other components or devices of the technology 100, such as a crash record or crash report service provided on one or more computing devices 138. Techniques for identifying a vehicle crash, near-crash, or another unsafe condition at the vehicle are described in U.S. patent application Ser. No. 16/035,861, entitled "Vehicle Telematics of Vehicle Crashes," filed Jul. 16, 2018, the entire contents of which is incorporated by reference.

After identification, the risk sources 110 and safety events experienced by the vehicle 102 or other vehicles in the surrounding environment 104 can be reported to one or more other modules, such as the risk correlation module 212, the risk scoring module 214, and the safety performance evaluation module 216. For example, the risk identification module 208 can report the presence or exposure level, or both, of each risk source 110 to one or more other modules, and the safety event identification module 210 can report the occurrence or type, or both, of each safety event to one or more other modules. In some cases, the risk identification module 208 or the safety event identification module 210, or both, are capable of providing a timestamp or another marker in the sensor data of the identified risk sources 110 or safety events to the other modules in addition to, or in lieu of, reporting the identifications directly.

To accurately determine the risk of a safety event experienced by a vehicle 102, it can be useful to understand the risk of a safety event posed by each risk source 110 or set of risk sources. Accordingly, the risk correlation module 212 may process the sensor data produced at the vehicle 102, the identified risk sources 110 received from the risk identification module 208, and the identified safety events received from the safety event identification module 210 to establish a correlation between each risk source 110 or set of risk sources and the occurrence of a safety event. This correlation may be used to determine the risk of a safety event posed by each risk source 110 or set of risk sources or combined with other information, such as presence and exposure level information, to determine the risk posed by each risk source or set of risk sources. The risk correlation module 212 can aggregate the sensor data, identified risks, and identified safety events received from one or more vehicles 102 or types of vehicles over many miles to increase the sample size and establish the correlation with greater accuracy. Further, the risk correlation module 212 can continually update the correlation as new sensor data is received from one or more of the vehicles 102.

The risk correlation module 212 is capable of using one or more algorithms to establish the correlation between each risk source or set of risk sources and a safety event. For example, the risk correlation module 212 can determine how often a risk source or set of risk sources is present during the occurrence of a safety event to establish the correlation. In some cases, the risk correlation module 212 is capable of determining which risk source or set of risk sources is the actual or proximate cause of the safety event to establish the correlation. In some cases, the risk correlation module 212 is capable of accounting for the exposure level of a risk source or set of risk sources during the occurrence of a safety event to establish the correlation. In some cases, the risk correlation module 212 is capable of using machine learning techniques to establish the correlation. In some cases, the risk correlation module 212 is capable of determining a different correlation for a particular risk source when it appears with one or more other risk sources than when it appears alone to account for the accumulative effect of certain risks. To increase the strength of the correlation under various circumstances, the risk correlation module 212 may establish multiple correlation matrices specific to, for example, a vehicle type, a particular safety event, or a particular environment 104, among others.

Once a correlation is established, the risk scoring module 214 is capable of using the correlation and the sensor data to derive a risk score for the vehicle 102 or other vehicles in the environment 104. The risk score for each vehicle can represent the risk of a safety event experienced by the vehicle during a particular period of operation, such as a particular distance traveled or time operated, based on the actual risk sources encountered by the vehicle and the risk of a safety event posed by each risk. In this way, the risk score can serve as an accurate measure of the risk of a safety event experienced by the vehicle during the period of operation.

To determine the risk score for the vehicle 102 or other vehicles in the environment 104, the risk scoring module 214 is capable of receiving from, for example, the risk identification module 208 an indication of the risk sources 110 encountered by the vehicle during a particular period of operation. The period of operation can include a particular distance traveled, such as a mile or any other distance, or a particular time operated, such as five minutes or any other time, among others. The risk scoring module 214 can use the correlation information received from the risk correlation module 212 to determine the risk posed by each risk source. In some cases, the risk scoring module 214 is capable of applying a weight to some or all of the identified risk sources 110 based on the exposure level of the risk source or the presence (or absence) of the risk source or other risk sources, or both, among others. The risk scoring module 214 can determine the risk score for the particular period of operation by, for example, calculating a sum of the risk or the weighted risk posed by each risk source. In some cases, the risk scoring module 214 is capable of normalizing the risk score to a standard risk for a particular period of operation. For example, as indicated previously, the risk scoring module 214 can determine an average or median level of risk experienced by a vehicle over a unit distance traveled, such as a mile under standard risk conditions, and can normalize each risk score so that high-risk travel receives an above-normal risk score and low-risk travel receives a below-normal risk score.

In some cases, the risk scoring module 214 (or another module, such as the risk scoring module 212) is capable of filtering, discounting, or ignoring certain risk sources or types of risk sources when determining the risk score. For example, when comparing the safety performance of autonomous vehicles and conventional vehicles, it may be useful to filter out driver-specific risk sources or vehicle-specific risk sources, or both, so that the safety performance of each vehicle is evaluated based on how the vehicle 102 or the driver 106 of the vehicle responds to environmental risk sources. In this way, the technology 100 can compare, for example, the safety performance of autonomous vehicles and conventional vehicles without biases due to risks created by driver-specific behavior or vehicle-specific problems.

The safety performance evaluation module 216 (which is sometimes referred to as the "safety performance module") is capable of using the risk score and the identified safety events to evaluate the safety performance of a vehicle or vehicle type. For example, the safety performance module 216 can receive a risk score for a particular period of operation, such as a mile, from the risk scoring module 214. The safety performance module 216 can use information received from the safety event identification module 210 to determine the number of safety events experienced by the vehicle over the same period for which the risk score was calculated. The safety performance module 216 can then calculate the number of safety events experienced by the vehicle relative to the risk score for the vehicle to determine the vehicle's safety performance for the particular period of operation (e.g., the number of safety events divided by the risk score). The safety performance of the vehicle may be represented as a ratio, a percentage, a score, a ranking, or any other metric, and may be communicated to one or more components or devices of the technology 100, such as the on-board computer 108, the one or more telematics devices 114, the database 136, or a computing device 138, or combinations of them, as discussed below.

In some cases, the safety performance evaluation module 216 is capable of combining multiple risk scores and safety events to evaluate the safety performance of a vehicle or vehicle type over multiple periods of operation. In some cases, the safety performance module 216 is capable of combining the risk scores from, for example, each mile of a trip by a vehicle to determine a risk score for the entire trip. We use the term "trip" broadly to include, for example, any instance of travel from an origin place to a destination place. In some cases, the safety performance module 216 may combine the risk scores for each mile traveled by a vehicle or vehicle type to determine a risk score for the cumulative distance traveled by the vehicle or vehicle type. The safety performance module 216 is capable of determining the combined number of safety events experienced by the vehicle or vehicle type over the same operation period for which the combined risk score was calculated. The safety performance module 216 can then calculate the combined number of safety events experienced by the vehicle or vehicle type relative to the combined risk score for the vehicle or vehicle type to determine the safety performance for the vehicle or vehicle type. By determining the safety performance of a vehicle or vehicle type over multiple operation periods, the safety performance module 216 can attain more accurate and statistically significant performance metrics that can be compared among vehicles or types of vehicles.

In some cases, the safety performance evaluation module 216 is capable of applying the risk score to determine a risk-normalized distance traveled by a vehicle or vehicle type. For example, in cases where the risk score is calculated in mile increments, the safety performance module 216 can apply the risk score for a particular mile to determine a risk-normalized mile for the vehicle or vehicle type. In this way, the distance traveled by the vehicle or vehicle type can be adjusted for safety performance evaluation purposes to provide greater weight to high-risk travel and less weight to low-risk travel. In some instances, determining a risk-normalized mile involves comparing the distance traveled to a typical risk-normalized mile (such as the "yearly average" mile or the "Cambridge" mile discussed previously). In some cases, the safety performance module 216 may combine the risk-normalized distances for a particular vehicle or vehicle type to determine a total risk-normalized distance traveled by the vehicle or vehicle type. The safety performance module 216 can calculate the number of safety events experienced over the actual distance traveled by the vehicle or vehicle type relative to the risk-normalized distance to determine the safety performance of the vehicle or vehicle type. By applying the risk score to determine a risk-normalized distance traveled, the safety performance metrics described in this specification can be compared with conventional metrics for vehicle safety performance, such as the number of safety events per vehicle-mile-traveled (VMT).

After determining the safety performance of a vehicle or vehicle type, the safety performance evaluation module 216 is capable of analyzing the safety performance and comparing it with the safety performance of other vehicles or types of vehicles. For example, the safety performance module 216 can compare the safety performance of different vehicles or types of vehicles to determine a ranking based on the relative safety performance of each vehicle or vehicle type. In some cases, the safety performance module 216 is capable of comparing the safety performance of different vehicles or types of vehicles to make relative claims about the operators of the vehicles or vehicle types. For example, the safety performance module 216 can compare the safety performance of autonomous vehicles with that of conventional vehicles to determine the relative safety performance of the human and computer-implemented operators of such vehicles. In some cases, the safety performance module 216 is capable of comparing the safety performance of a particular vehicle 102 or driver 106 with one or more previous safety performance evaluations to determine the safety performance of the vehicle or the driver over time.

In some cases, the safety performance module 216 is capable of comparing the safety performance of two or more vehicles that are traveling in the same environment 104 at the same time. For example, the technology 100 can use sensor data acquired at a vehicle 102 to determine the safety performance of both the vehicle 102 and other vehicles in the surrounding environment 104, as discussed above. Alternatively, additionally, the technology 100 can use sensor data acquired by separate sensors 112 at each vehicle 102 in the environment 104 to determine the safety performance of each vehicle. Because each vehicle is likely facing the same or substantially similar risks due to their proximity in the environment 104, strong comparisons of the relative safety performance of each vehicle or vehicle operator can be made.

In some implementations, the safety performance evaluation module 216 can provide the safety performance evaluation to one or more components or devices of the technology 100. For example, in some cases, the safety performance module 216 is capable of causing the server 130 to provide the safety performance evaluation to the database 136 for storage, to the on-board computer 108 or the telematics devices 114 over the network 134, or to one or more computing devices 138 over a network 140, which can be the Internet. Each of the computing devices 138 can be associated with a user or owner of the vehicle 102, a user or owner of the telematics devices 114, a vehicle safety organization, an vehicle producer, an insurance company, a ridesharing company, an emergency service, a call center, an analyst, a researcher, a host of the technology, or combinations of these participants, among others. The server 130 can provide the safety performance evaluation to the components or devices through a webpage, an application, an API, or a notification, or combinations of them, among others. Once received, each of the components or devices may present the safety performance evaluation to a user of the component or device using, for example, a graphical user interface presented on a display of the component or device.

In general, the safety performance evaluation module 216 can provide any aspect of the safety performance evaluation to the other components or devices, including one or more of the identified risk sources 110, the identified safety events, the risk score, or the determined safety performance, or combinations of them, among others. In some cases, the safety performance module 216 is capable of providing one or more comparisons of the safety performance for the vehicle with the safety performance of the same or different vehicles. In some cases, the safety performance module 216 is capable of providing recommendations or suggestions to increase the safety performance of the vehicle, such as suggestions to the vehicle 102 or the driver 106, or both, to operate the vehicle in a safer manner or recommendations to the vehicle or driver, or both, to follow a safer route in future trips. In some cases, the safety performance module 216 is capable of indicating a time or distance, such as a number of risk-normalized miles, that a particular vehicle or vehicle type needs to travel to attain a certain level of safety performance. For example, the safety performance module 216 can indicate a number of risk-normalized miles that an autonomous vehicle may need to travel to achieve a comparable or higher safety performance than conventional vehicles and human drivers.

In some cases, the safety performance evaluation can be used by government agencies in certifying the safety of, for example, an autonomous vehicle. In some cases, the safety performance evaluations can be used to improve the safety of algorithms used for navigating an autonomous vehicle. For example, algorithms used to control an autonomous vehicle can be updated in a manner to improve the safety performance evaluation. These updates can be used to improve the evaluation of driving safety or to improve the actual driving safety, or a combination of the two, among other things. In some cases, the safety performance evaluation can be used to determine one or more routes that should be taken during a vehicle's commute to reduce environmental risks.

Various modifications to the safety performance evaluation technology 100 are possible. For example, in some cases, the technology 100 can average multiple risk scores from one or more vehicles or types of vehicles over the same distance traveled to determine an average risk score for the particular distance. In this way, the technology 100 can identify high-risk routes, which may allow the technology 100 to suggest safer alternatives to the vehicle 102 or the driver 106, or both, among others. In some cases, the technology 100 can apply the risk score to normalize other risk exposure metrics, such as time driven, and is not limited to normalizing distance traveled.

Although the server 130 is described as processing the sensor data associated with the vehicle 102 to evaluate the safety performance of the vehicle or other vehicles within the environment 104, other components and devices of the technology 100, such as the on-board computer 108, the telematics devices 114, or the computing device 138, or combinations of them, may process the sensor data in addition to, in combination with, or instead of the server 130 to carry out the techniques described here. Similarly, although specific modules, including the risk identification module 208, the safety event identification module 210, the risk correlation module 212, the risk scoring module 214, and the safety performance evaluation module 216 are described as carrying out certain aspects of the techniques described here, some or all of the techniques may be carried out by additional, fewer, or alternative modules in some implementations. Further, although only one server 130, one database 136, and one computing device 138 are illustrated in FIG. 1, the technology 100 may include any number of computing devices and data storage devices located in a single place or distributed and communicatively connected using any number of networks.

Figure 3:
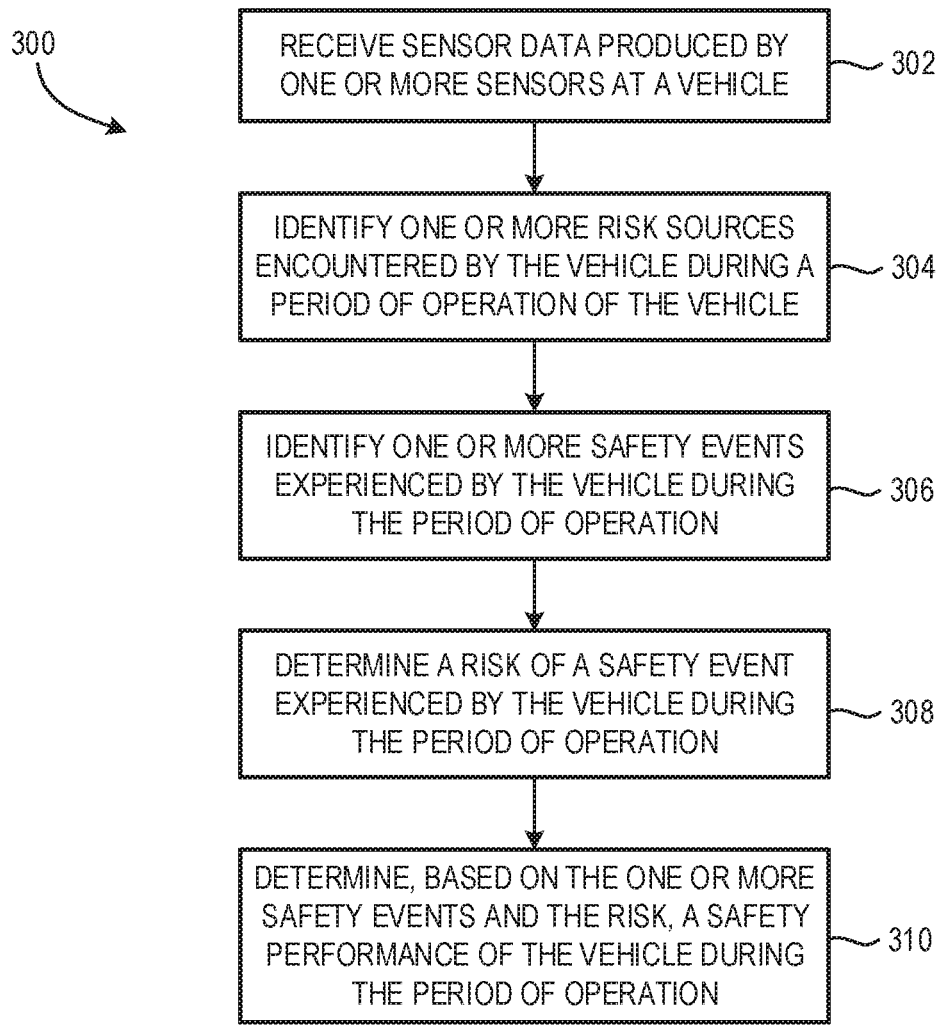
FIG. 3 is a flowchart depicting a method for monitoring and evaluating the safety performance of vehicles.

FIG. 3 illustrates an example process 300 for evaluating the safety performance of a vehicle. At least a portion of the process 300 can be implemented using one or more processors, such as the processors 200 operating on the server 130. Operations of the process 300 include receiving sensor data produced by one or sensors at a vehicle (302). The sensors may be installed in the vehicle or included in a telematics device brought into the vehicle, or both.

The sensor data is processed to identify one or more risk sources experienced by the vehicle during a period of operation (304). The risk sources may put the vehicle at risk of a safety event. In some cases, the one or more risk sources may include environmental risk sources due to conditions or features of the environment in which the vehicle travels over the distance. In some cases, the environmental risk sources may include other vehicles in the environment. In some cases, driver-specific risk sources due to conduct of a driver of the vehicle or vehicle specific-risk sources due to damage to or malfunctioning of the vehicle, or both, may be filtered from the one or more risk sources. In some cases, the period of operation may be associated with a distance traveled by the vehicle or a time of operation of the vehicle.

The sensor data is processed to identify one or more safety events experienced by the vehicle during the period of operation (306). In some cases, the one or more safety events may include a crash of the vehicle, a near-crash of the vehicle, or another unsafe condition at the vehicle, or combinations of them.

A risk of a safety event experienced by the vehicle during the period of operation is determined based on the one or more risk sources (308). In some cases, the risk can be measured by a risk score. In some cases, determining the risk may include determining a risk of a safety event posed by each of the risk sources, the exposure-level of the risk source, or the presence of the risk source, or combinations of them, among others. The risk of a safety event posed by each risk source can be summed to determine the risk for the vehicle during the period of operation. In some cases, the risk may be normalized based on a standard risk of a safety event experienced by the vehicle or other vehicles during the period of operation. In some cases, the risk score may be applied to the period of operation to produce a risk-normalized period of operation, such as a risk-normalized distance traveled by the vehicle. In some cases, the risk of a safety event experienced by the vehicle may be combined with other risks of a safety event experienced by the vehicle or other vehicles having a same vehicle type to produce a combine risk of a safety event for the vehicle or the vehicle type.

The safety performance of the vehicle during the period of operation is determined based on the one or more safety events and the risk (310). In some cases, determining the safety performance of the vehicle may include determining the sum of the one or more safety events relative to the risk. In some cases, the risk may be applied to the period of operation to produce a risk-normalized period of operation, such as a risk-normalize distance traveled by the vehicle, and the safety performance of the vehicle during the period of operation can be determined based on the sum of the one or more safety events relative to the risk-normalized period of operation. In some cases, the sum of the one or more safety events is a weighted sum. In some cases, each of the safety events of the one or more safety events are weighted according to the severity of the safety event. For example, a safety event that results in a totaled vehicle can be weighted more heavily than a safety event that resulted in minor paint damage to the vehicle. In some cases, the risk of a safety event experienced by the vehicle may be combined with other risks of a safety event experienced by the vehicle or other vehicles having a same vehicle type to produce a combined risk of a safety event for the vehicle or the vehicle type, and the safety performance of the vehicle or vehicle type can be determined based in part on the combined risk of a safety event.

In some implementations, the sensor data may be processed to identify one or more risk sources and safety events experienced by a second vehicle in a same environment as the vehicle during the period of operation. A risk of a safety event experienced by the second vehicle during the period of operation may be determined based on the one or more risk sources encountered by the second vehicle. The safety performance of the second vehicle may be determined during the period of operation based on the sum of the one or more safety events experienced by the second vehicle relative to the risk for the second vehicle. In some cases, a relative safety performance of the vehicle during the period of operation can be determined by comparing the safety performance of the vehicle with the safety performance of the second vehicle.

Other implementations are also within the scope of the following claims.

What is claimed is:

1. A method implemented by a machine, comprising:
receiving, by a machine in communication with one or more sensors at a vehicle, sensor data from the one or more sensors at the vehicle, the sensor data having been generated while the vehicle traveled a route comprising one or more segments each having a distance, wherein the one or more sensors comprise at least one of an accelerometer or a GPS;
storing, in memory of the machine, the sensor data;
retrieving the sensor data from the memory and analyzing the sensor data retrieved from the memory by the machine, the analyzing comprising:
by the machine, identifying, based on the sensor data, one or more risk sources encountered by the vehicle while the vehicle traveled the route, the one or more risk sources including at least one other vehicle encountered by the vehicle along the route;
by the machine, identifying, based on the sensor data, one or more safety events that were experienced by the vehicle with respect to the one or more risk sources, the one or more safety events including at least one safety event experienced with respect to the at least one other vehicle;
by the machine, determining, based on the one or more risk sources and the one or more safety events, a risk of a safety event associated with the one or more segments of the route;
by the machine, accessing, from persistent storage, data representing a normalized risk of the safety event associated with a normalized segment, wherein the normalized segment has a normalized distance determined based on a risk evaluation;
by the machine, adjusting the risk of the safety event associated with the one or more segments of the route based on the data representing the normalized risk of the safety event associated with the normalized segment, wherein the adjusting is based in part on a relationship between the distance of the one or more segments and the normalized distance of the normalized segment; and
based on the vehicle having traveled the route and the adjusted risk associated with the one or more segments of the route, generating, by the machine, a measure of risk for the vehicle or a driver of the vehicle.

2. The method of claim 1, in which the risk is measured by a risk score.

3. The method of claim 1, in which the sensors are included in one or more telematics devices at the vehicle.

4. The method of claim 1, in which the one or more risk sources include environmental risk sources due to conditions or features of the environment in which the vehicle is operated.

5. The method of claim 4, in which the environmental risk sources include other vehicles in the environment.

6. The method of claim 4, comprising filtering, from the one or more risk sources, risk sources due to conduct of a driver of the vehicle.

7. The method of claim 1, in which the one or more safety events include a crash of the vehicle or near-crash of the vehicle, or both.

8. The method of claim 1, in which determining the risk of the safety event associated with the one or more segments of the route comprises calculating a sum of a risk of a safety event posed by each of the one or more risk sources encountered by the vehicle.

9. The method of claim 8, in which the sum of the risk of the safety event comprises a weighted sum.

10. The method of claim 8, in which determining the risk of the safety event associated with the one or more segments of the route comprises determining a sum of the one or more safety events relative to the sum of the risk of the safety event.

11. The method of claim 10, in which the sum of the one or more safety events comprises a weighted sum in which each of the one or more safety events is weighted based on the severity of the safety event.

12. The method of claim 1, in which the vehicle is a first vehicle, the method comprising:
based on the sensor data from the one or more sensors at the first vehicle, determining a measure of risk for a second vehicle or a driver of the second vehicle based on the second vehicle having traveled along at least part of the route of the first vehicle.

13. The method of claim 12, comprising determining the measure of risk for the second vehicle or the driver of the second vehicle based on identifying, from the sensor data from the one or more sensors of the first vehicle, one or more risk sources encountered by the second vehicle along the at least part of the route.

14. The method of claim 12, comprising identifying, based on the sensor data from the one or more sensors at the first vehicle, one or more safety events experienced by the second vehicle with respect to the one or more risk sources.

15. The method of claim 1, comprising
combining the risk of a safety event associated with the one or more segments of the route with a risk of a safety event for one or more other segments of another route for which the vehicle has traveled; and
generating the measure of risk for the vehicle or the driver of the vehicle based in part on the combined risk.

16. The method of claim 1, in which generating the measure of risk for the vehicle or the driver of the vehicle comprises:
determining, based on the sensor data, a period of operation for the vehicle while the vehicle traveled the one or more segments of the route; and
adjusting the period of operation based on the adjusted risk of a safety event associated with the one or more segments of the route.

17. The method of claim 16, in which the period of operation comprises a distance or time traveled by vehicle along the one or more segments of the route.

18. The method of claim 1, further comprising transmitting the measure of risk to a device for presentation to a user.

* * * * *